Patented May 17, 1932

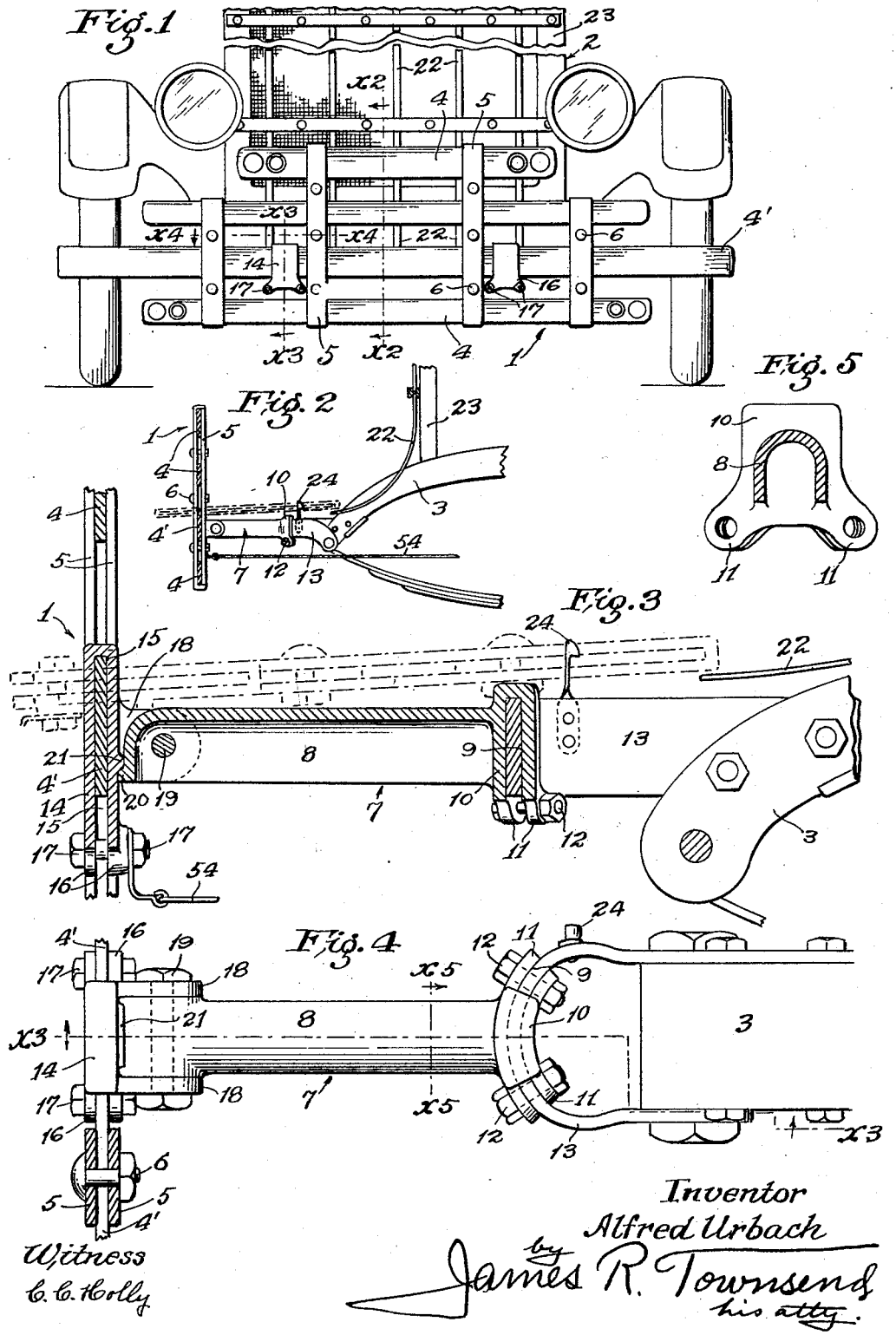

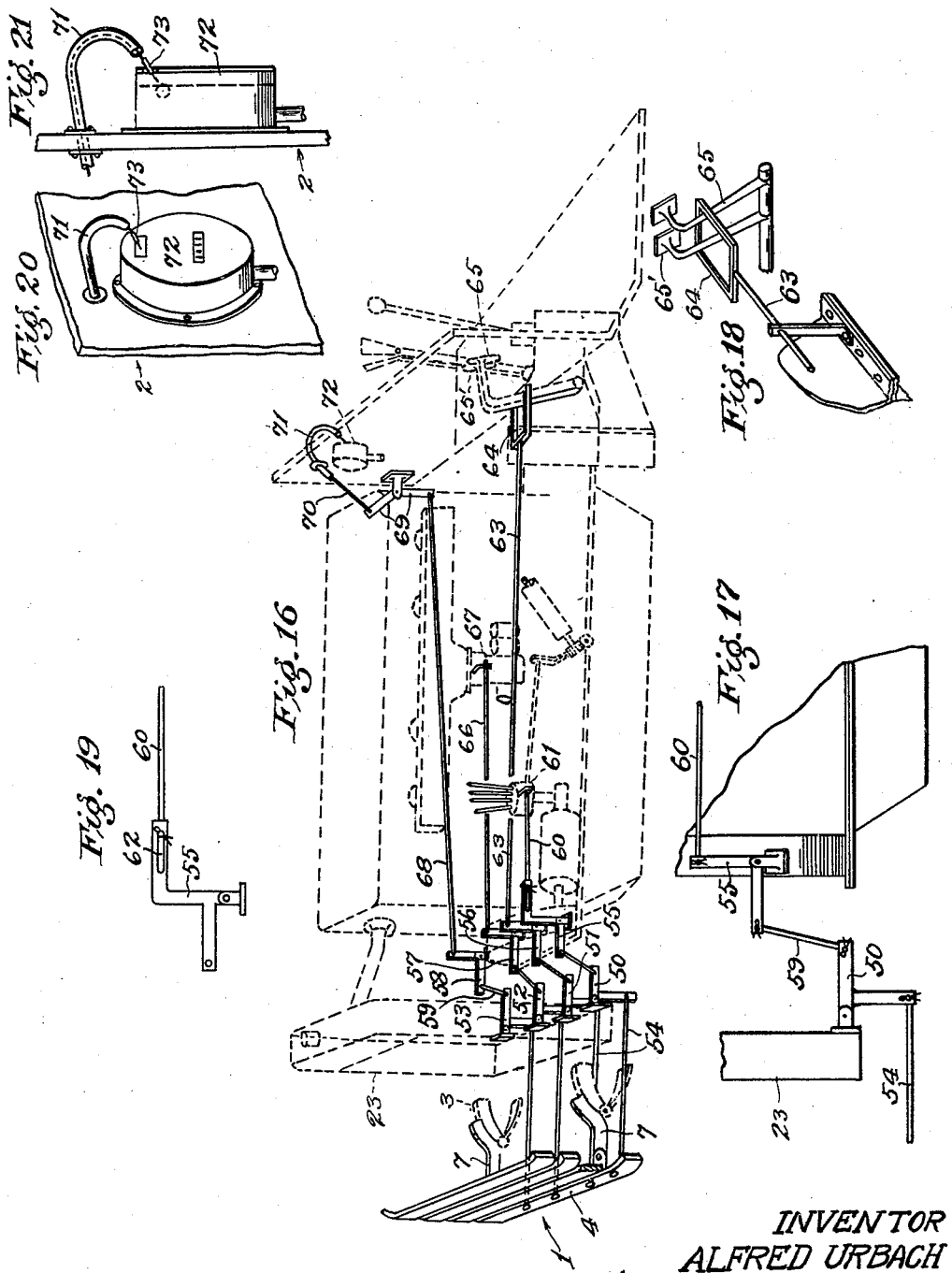

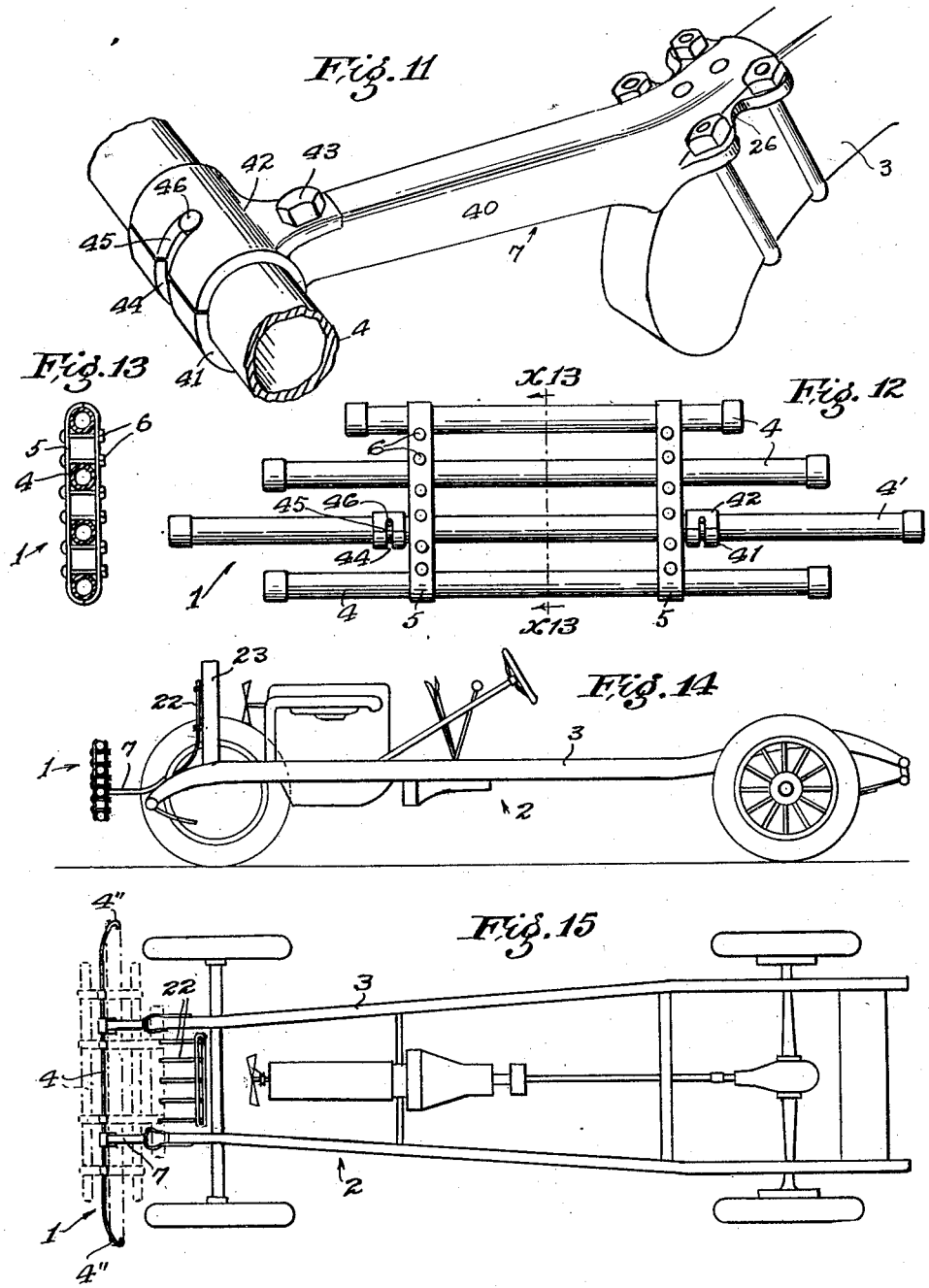

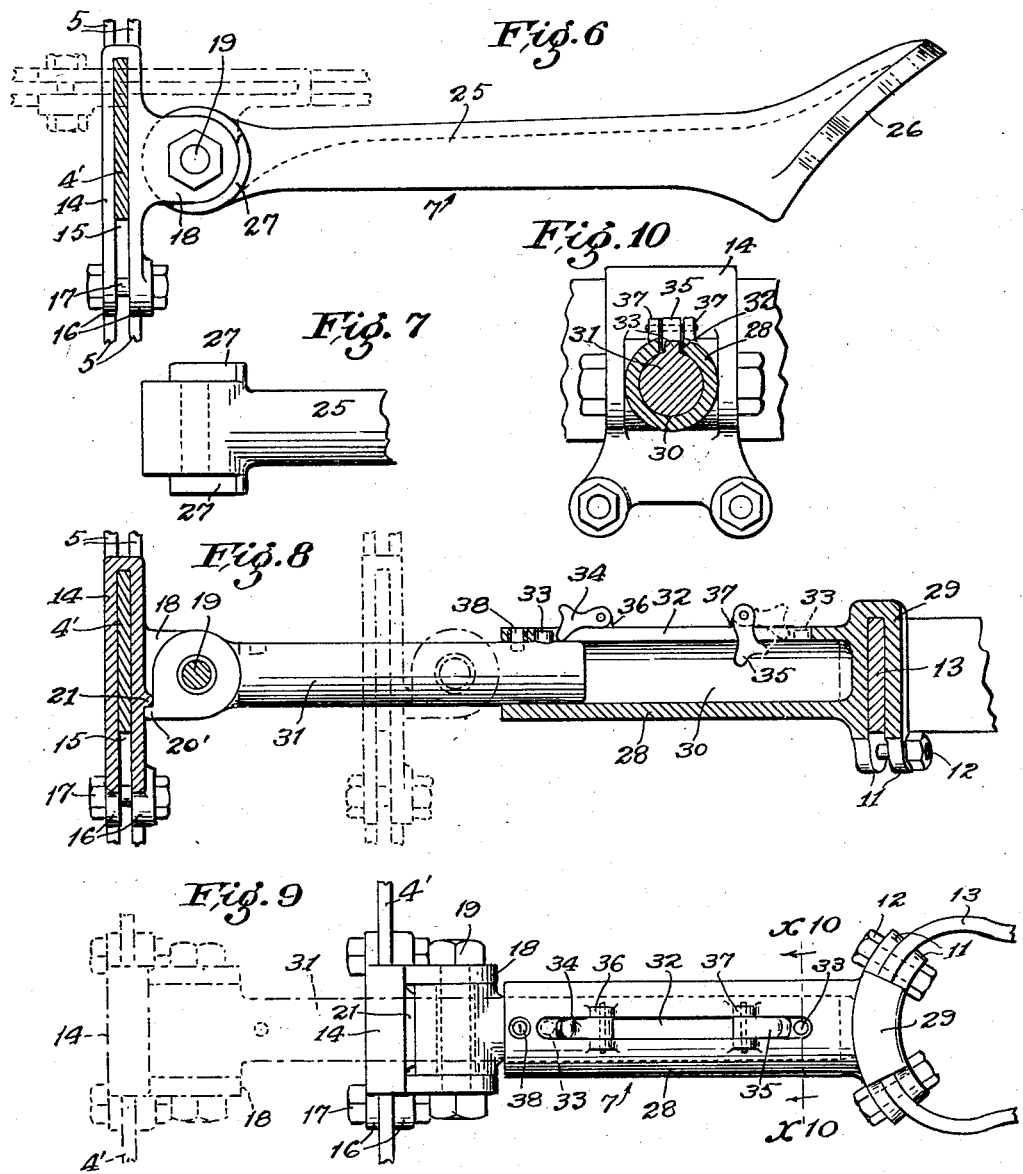

1,859,186

UNITED STATES PATENT OFFICE

ALFRED URBACH, OF LOS ANGELES, CALIFORNIA

SAFETY FENDER

Application filed May 25, 1929. Serial No. 366,076.

This invention relates to that type of safety fender which is adapted to be mounted on a vehicle, and which is tiltably mounted thereon to pick up a person struck thereby.

An object of my invention is to provide a novel fender which is tiltable on the vehicle, and which assumes a substantially horizontal position when an object is struck thereby.

Another object is to provide a novel fender, which will automatically stop the vehicle when an object is struck thereby.

A further object is to provide a novel fender which will prevent serious injury to a pedestrian when struck by the vehicle to which my fender is attached.

A feature of my invention is that the fender is normally mounted in an upright or vertical position and is adapted to tilt rearward to a practically horizontal position when an object is struck thereby, and thus provides a platform that is adapted to pick up such object.

Further features are in the provision of novel means whereby when an object is struck the speed at which the vehicle is then travelling may be indicated and the machine will be thrown out of gear, the gas shut off, the brakes applied and the spark retarded to thus further slow down the motive power.

Other objects, advantages and features of invention may appear from the accompanying drawings, the subjoined detailed description and the appended claims.

The accompanying drawings illustrate the invention.

Figure 1 is a front view of my fender on a vehicle, a fragment of which is shown.

Fig. 2 is a fragmentary sectional view on line $x2$, Fig. 1.

Fig. 3 is a fragmentary sectional view on line $x3$, Figs. 1 and 4.

Fig. 4 is a fragmentary sectional view on line $x4$, Fig. 1.

Fig. 5 is a sectional view on line $x5$, Fig. 4.

Fig. 6 is a side view of a slightly modified form of bracket, with a fragment of the fender shown in section thereon.

Fig. 7 is a fragmentary plan view of the bracket shown in Fig. 6.

Fig. 8 is a longitudinal sectional view of another modified form of bracket.

Fig. 9 is a plan view of the bracket shown in Fig. 8.

Fig. 10 is a sectional view on line $x10$, Fig. 9.

Fig. 11 is a perspective view of a further modified form of bracket.

Fig. 12 is a front elevation of a modified form of fender.

Fig. 13 is a sectional view taken on line $x13$, Fig. 12.

Fig. 14 is a side elevation of the fender shown in Fig. 12 attached to a vehicle chassis.

Fig. 15 is a plan view of my fender of the type shown in Fig. 1, as attached to a vehicle chassis.

Fig. 16 is a fragmentary diagrammatic perspective view of the fender and the vehicle control mechanism.

Fig. 17 is a side view of levers, whereby the vehicle parts are controlled.

Fig. 18 is a perspective view of the brake and clutch pedal control.

Fig. 19 is a side view of one of the bell cranks used to control the spark advance mechanism.

Fig. 20 is a perspective view of the speedometer and marker therefor.

Fig. 21 is a side view of the same.

My fender 1 is preferably mounted on a vehicle 2, and secured to the frame 3 of the vehicle.

The fender consists of a plurality of superposed bars 4, which may be either flat as shown in Fig. 1, tubular as shown in Fig. 12, or any other desired shape. One of the bars 4' adjacent the bottom of the fender extends outwardly towards each side and beyond the line of the outer edge of the wheels to protect the wheels, and said bar is curved rearwardly at the ends thereof, as at 4''. The bars 4 are held in proper spaced relation by straps 5, which encircle said bars. Bolts 6 extend through the straps between adjacent bars, and thus draw the straps tightly against the bars to hold them in position.

The fender is pivotally mounted and spaced from the forward end of the vehicle 2 by a pair of brackets 7. In the type shown in Figs. 1 to 4 inclusive the bracket consists of an integrally hollow cast arm 8, in the rear end of which an arcuate slot 9 is formed in an integral formed arcuate base 10. Pairs of juxtapositioned ears 11 depend from the base 10, and bolts 12 extend therethrough to clamp the base to a strap 13 which is bolted or otherwise secured to the vehicle frame 3.

The strap 13 rests in the slot 9 and the bolts 12 pass below the strap and through the ears 11. A mounting plate 14 is formed with a slot 15 in which the bar 4' rests, and with pairs of juxtapositioned ears 16 through which bolts 17 extend to clamp the plate securely to the bar. A pair of rearwardly extending spaced ears 18 are formed on the plate 14, and the forward end of the arm 8 extends therebetween, and a bolt 19 passes through said ears and arm, thus pivotally mounting the fender on the vehicle.

The arm 8 is formed with a stop lug 20 on the forward end thereof, and the plate 14 is formed between the ears, with a lug 21 cooperating therewith and engaging the lug 20 to limit the forward tilting movement of the fender 1.

In practice when a pedestrian is struck, the fender will tilt rearwardly to the dotted line position, in Fig. 3, and will pick up and carry the person thereon. A plurality of straps 22 are mounted on the radiator 23, and are curved outwardly at the bottom to meet the upper edge of the fender 1 when in tilted position, so that the pedestrian is fended away from the radiator, and thus prevent contact with the radiator which in many instances is hot to thus prevent burning a person picked up. When the fender is tilted it forms with the straps 22 a platform that is complete from the now forward edge of the fender to the radiator. This prevents likelihood of a person picked up dropping between the radiator and the fender.

Spring fingers 24 are provided on the straps 13 and engage one of the bars 4 when the fender is fully tilted, and thus prevent the fender from returning to vertical position after an object is struck. This prevents likelihood of a person being tilted off of the fender after such person is received thereon.

In Figs. 6, 7, the bracket 7 consists of a hollow arm 25, on the rear of which a plate 26 is integrally formed. This plate rests over the frame 3 and U-clamps, as shown in Fig. 11 are adapted to extend through the plate and around the frame to hold the arm in position. The fender is mounted on the forward end of the arm in a way previously described. A pair of arcuate stop lugs 27 extend from the sides of the arm 25 adajacent the forward end thereof, and the ears 18 engage the lower or upper ends of said lugs to limit the forward or rearward tilt respectively, of the fender.

In the form shown in Figs. 8–10 inclusive, an arm 28 is formed with a base plate 29 on the rear thereof, which is identical in construction to the base 10 previously described, and which straddles the strap 13 as previously pointed out. The arm 28 is formed with a longitudinal bore 30, in which a post 31 is slidably mounted. A slot 32 is provided in the top of the arm 28, and a pin 33 rises from the post 31 into said slot.

Thus the post is limited in its forward and rearward movement and is prevented from rotating. Latches 34, 35 are pivoted to ears 36, 37 respectively, adjacent the forward and rearward end of the slot 32 respectively, and extend into said slot to engage the pin 33, thus holding the post 31 in extended or retracted position.

A lock 38 also engages the post 31 in the extended and retracted position and prevents removal of the posts and the theft of the fender.

The fender 1 is mounted on the forward end of the posts 31 by the plates 14 as previously described, and a lug 20' is formed on the post to cooperate with the lug 21 to limit the forward tilt of the fender.

With this type of bracket it is possible to move the fender out of the bracket after parking so that other vehicles will not be able to park as close to the vehicle proper as they would if the fender was not extended and when it is desired to again use the vehicle the fender may be moved closer to the vehicle so that the over-all length of the vehicle is shortened. This is of great advantage when getting out of a small parking space.

In Fig. 11 is shown a bracket 40 for the tubular fender shown in Fig. 12. The method of securing the bracket to the vehicle is identical to that described in Figs. 6 and 7. The forward end of the bracket 40 is formed with a hollow holder 41, in which the tubular bar 4 rests, and a plate 42 cooperates therewith and engages the bar to hold said bar in position.

A bolt or machine screw 43 holds the plate 42 in position. Aligned slots 44, 45 are formed in the holder 41 and plate 42, respectively, and a pin 46 fixed in the bar 4 extends into the slots and engages the ends thereof to limit the forward or rearward tilt of the fender. The fender in Fig. 11 is shown as being in a horizontal position.

When a pedestrian is struck by the vehicle, employing my fender, he will be picked up by the fender, which will tilt rearwardly and form a platform to receive the pedestrian. This action breaks the fall and tends to prevent injury. In addition I have provided automatic means whereby the tilting of the fender sets the brakes, releases the clutch, retards the spark, shuts off the fuel supply and indicates the speed at the moment of the collision.

To accomplish these results, I pivot four bell crank levers 50, 51, 52, 53, rearwardly of the fender 1, and one arm of each of said levers is connected to the lower bar 4 of the fender by a rod or cable 54.

The other arm of each of the four bell crank levers is secured each to one arm of a second series of bell crank levers 55, 56, 57, 58 by a rod 59. The levers 55, 56, 57, 58 are mounted rearwardly of the first named levers and suitably pivoted to the vehicle.

The other arm of the bell crank 55 is connected by a rod 60 to the distributor 61, thus retarding the spark when the fender is swung rearwardly.

As shown in Fig. 19, a slot 62 is provided in the arm of the lever into which the rod 60 extends, which permits freedom of movement for manual adjustment of the spark.

From the other arm of the lever 56 a rod 63 extends to a yoke 64, which yoke extends around the brake and clutch pedals 65, 65′ to depress them to actuate the bracket and to release the clutch and apply the foot brake.

From the other arm of the lever 57 which is slotted as in lever 55, a rod 66 extends to the carburetor 67, and a rod 68 extends from the other arm of the lever 58 to one arm of a bell crank 69. A flexible cable 70 is secured to the other arm of the lever 69, and extends through the guide tubing 71, which tubing terminates adjacent the face of the usual speedometer 72.

A lead point 73 is secured to the end of the cable 70, and as the fender 1 is tilted this point will mark upon the dial of the speedometer and thus indicate the speed at the moment of collision.

Thus it will be seen that as the fender is tilted, the vehicle brake is applied, the clutch released, the spark retarded, the fuel supply stopped, and the speed indicated.

The operation of the device will be evident from the foregoing description, and it is seen that the device herein disclosed, will provide a ready, positive and operatively simple means to bring a motor vehicle to a stop after a pedestrian has been struck and does not subject the injured person to the possibility of being dragged to death, for the reason that all of the car controls are automatically shut off at the moment of collision.

I claim:—

1. In a vehicle, a fender comprising a plurality of superposed bars, means securing said bars together, brackets secured to said vehicle, means pivotally mounting said fender on said brackets so that said fender is adapted to be moved rearwardly about its pivot, and stop means on said brackets engaging said fender to normally hold the fender in approximately vertical position and permit said fender to be moved rearwardly about its pivot; and means operated by said fender when the fender moves rearwardly about its pivot and assumes a substantially horizontal position, to bring said vehicle to a stop.

2. In a vehicle, a fender comprising a plurality of superposed bars, means securing said bars together, brackets secured to said vehicle, means pivotally mounting said fender on said brackets so that said fender is adapted to be moved rearwardly about its pivot, and stop means on said brackets engaging said fender to normally hold the fender in vertical position and permit said fender to be moved rearwardly about its pivot, said fender being adapted to assume approximately a horizontal position on said brackets when a body is struck thereby; and means operated by said fender when the fender moves rearwardly about its pivot and assumes a substantially horizontal position, to bring said vehicle to a stop.

3. In a vehicle, a fender comprising a plurality of superposed bars, means securing said bars together; brackets comprising an arm, a base on said arm, said base having a slot formed therein, a strap, means securing said strap to the vehicle, said strap being adapted to enter said slot; means securing said base to said strap; and means pivoting said fender to said brackets.

4. In a vehicle, a fender comprising a plurality of superposed bars; means securing said bars together; brackets comprising an arm; a base on said arm, said base having a slot formed therein; a strap; means securing said strap to the vehicle, said strap being adapted to enter said slot; ears depending from said base; bolts extending through said ears to clamp said base to said strap; and means pivotally mounting said fender to said bracket.

5. In a vehicle, a fender comprising a plurality of superposed bars; means securing said bars together; brackets comprising an arm; a base on said arm, said base having a slot formed therein; a strap; means securing said strap to the vehicle, said strap being adapted to enter said slot; means securing said base to said strap; a mounting plate; means securing said mounting plate to the fender; ears on said mounting plate; a pin extending through said ears and said bracket; and stop means adapted to normally retain said fender in approximately vertical position.

6. In a vehicle, a fender comprising a plurality of superposed bars; means securing said bars together; brackets comprising an arm; a base on said arm, said base having a slot formed therein; a strap adapted to enter said slot; means securing said strap to the vehicle; means securing said base to said strap; a mounting plate; means securing said mounting plate to the fender; ears on said mounting plate; a pin extending through said ears and said brackets; a lug on said mounting plate; a lug on said arm adapted to engage said first named lug to normally retain said fender in approximately vertical position.

7. The combination of a vehicle having a carburetor and a spark control; a fender; means pivotally mounting said fender to said vehicle, said fender being normally in approximate vertical position and adapted to be moved rearwardly about its pivotal mounting to horizontal position; and means connected to said fender, and said carburetor and spark control whereby said carburetor and spark control are closed when the fender is swung on its pivot from vertical to horizontal position.

8. The combination of a vehicle having a speedometer; a fender; means pivotally mounting said fender on said vehicle; marking means adjacent said speedometer; and means connecting said fender and said marking means whereby the vehicle speed indicated on the speedometer is marked when the fender is swung on its pivot.

9. In combination with an automobile having a radiator; a tiltable fender movable toward and from the radiator and a plurality of straps mounted on the radiator and curved outwardly at the bottom to meet the upper edge of the fender when in tilted position; the tilted fender and the straps forming a platform complete from the forward edge of the fender to the radiator.

In testimony whereof, I have hereunto set my hand at Los Angeles, California, this 6th day of May, 1929.

ALFRED URBACH.